Figure 1:
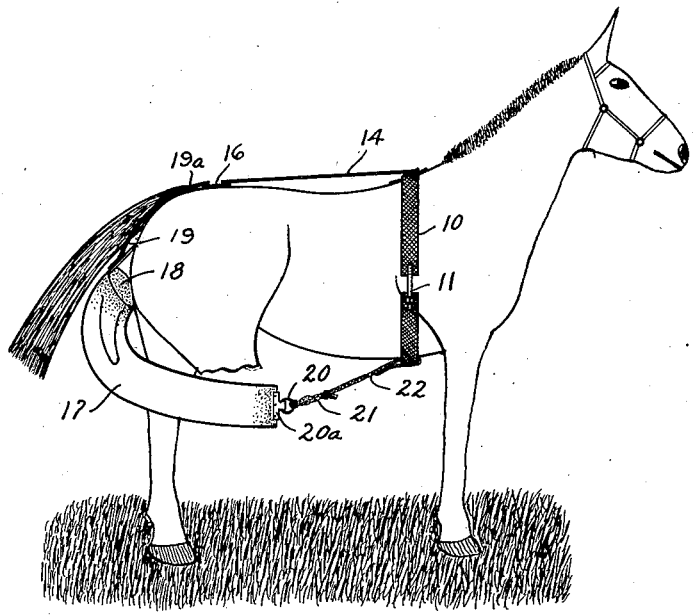

June 7, 1949.	G. E. ARNOLD	2,472,186
APPARATUS FOR COLLECTING URINE
FROM HORSES AND OTHER ANIMALS Filed Dec. 8, 1943	2 Sheets-Sheet 1

INVENTOR
Gilbert E. Arnold
By E. M. Fetherstonhaugh
ATTORNEY

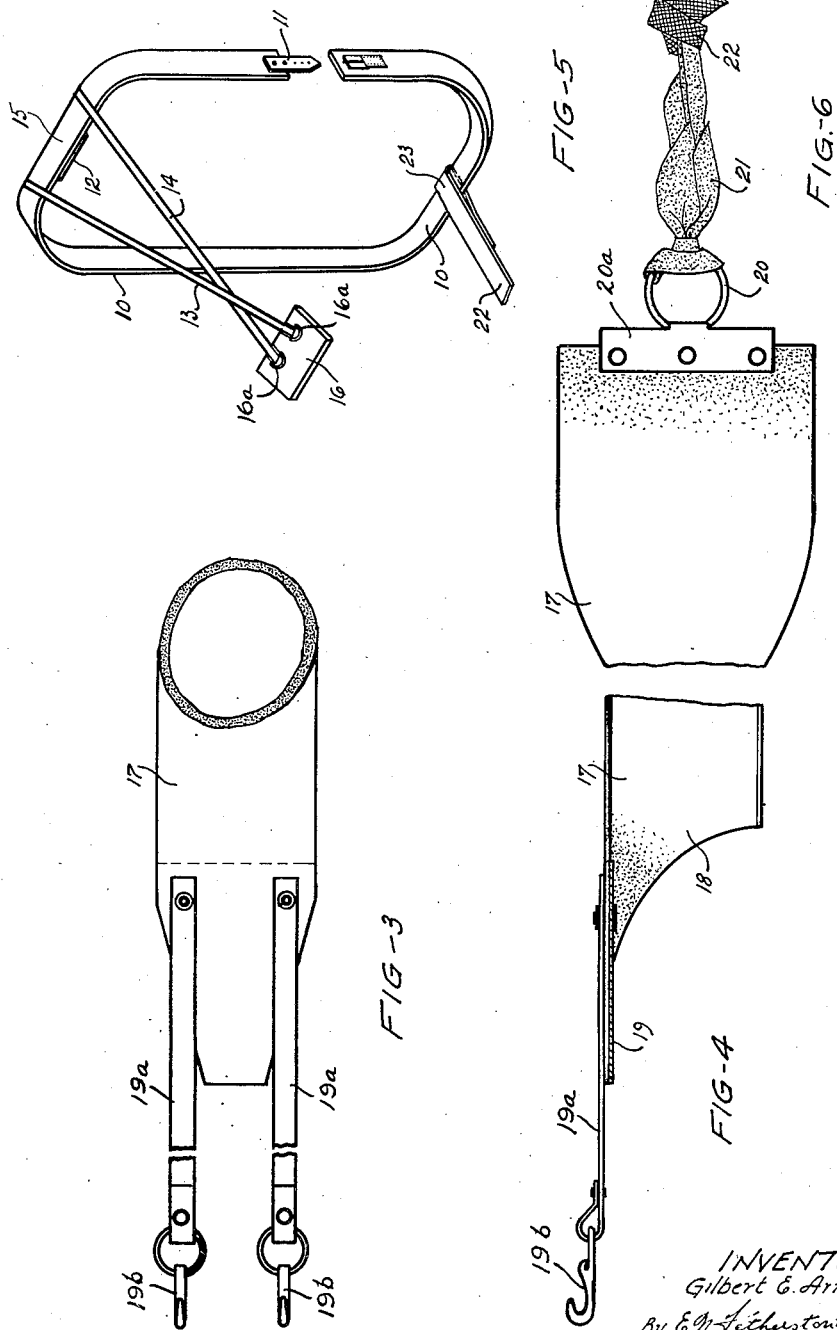

Patented June 7, 1949

2,472,186

UNITED STATES PATENT OFFICE 2,472,186

APPARATUS FOR COLLECTING URINE FROM HORSES AND OTHER ANIMALS

Gilbert Ewan Arnold, Grenville, Quebec, Canada

Application December 8, 1943, Serial No. 513,650

2 Claims. (Cl. 119—95)

This invention relates to apparatus for collecting urine from female quadruped animals, particularly pregnant mares.

It has been known for a good many years that valuable hormones are contained in the urine of pregnant mares, and methods have been devised for extracting such hormones. Such methods, however, have not heretofore been commercially developed because of practical difficulties in collecting the urine which constituted the raw material. Collection by pails, which was the only method previously practised, involved a substantial number of attendants and, even so, loss of urine. Thus the cost of the raw material was so high, and the difficulty of obtaining an assured regular supply in large volume was such, that for commercial purposes extraction of the natural hormones was abandoned as impractical, and resort was had to the much more difficult synthetic production of the hormones.

It is essential that urine which is to be processed for recovery of its hormones be free from admixed faeces, and accordingly any apparatus for its collection must be such that it can be attached to a mare without undue discomfort and has a container into which all urine will be directed but from which faeces will be excluded.

According to the present invention an apparatus which satisfactorily fulfils these requirements is provided. The apparatus comprises essentially a container, preferably in the form of a long narrow bag of flexible material, which is closed at its lower end and has an opening at its upper end. A shield, which is preferably of substantially stiffer material than the container if the latter is flexible, is connected to the container at one side of the opening, and projects above the opposite side of this opening. A strap is secured to the forward part of the body of the animal, i. e. forward of the belly, and two straps connected to the shield are adapted to extend one on each side of the tail of the animal, these two straps being connected to the body strap to hold the upper end of the shield against the animal below the anus and above the urethral orifice, and to hold the opposite side of the opening of the container below the urethral orifice. Preferably, the opening at the upper end of the container extends substantially diagonally to the length of the latter. Preferably also the container is arcuate in the direction of its length, and its lower end is connected to the body strap underneath the body of the animal by strap means which are shorter than the total length of the strap connections from the shield to the body strap. In order to prevent the two straps connected to the shield from chafing the animal on either side of the tail, a pad is preferably provided to rest on the back of the animal just above the base of the tail, the two shield straps being connected to the pad at laterally spaced points, and the pad being connected to the body strap by a longitudinal strap or straps.

An object of the invention is the provision of apparatus of the type just described.

Another object of the invention is the provision of apparatus of the above described type, in which the lower end of the container is connected to the body strap by a rupturable section.

A further object of the invention resides in the particular manner of supporting the upper end of the container, and including the above mentioned pad adapted to rest on the back of the animal slightly above the base of the tail, two straps adapted to extend one on each side of the tail of the animal and detachably connected to the pad at spaced points located one on each side of the center line of the animal, and at least one longitudinally extending strap connecting the pad to the body strap.

Though the apparatus is particularly designed for collecting the urine of pregnant mares, it is obviously adapted for collecting, free from admixed faeces, the urine of any female quadruped animal, if such collection should be desirable for any purpose.

Figure 2:
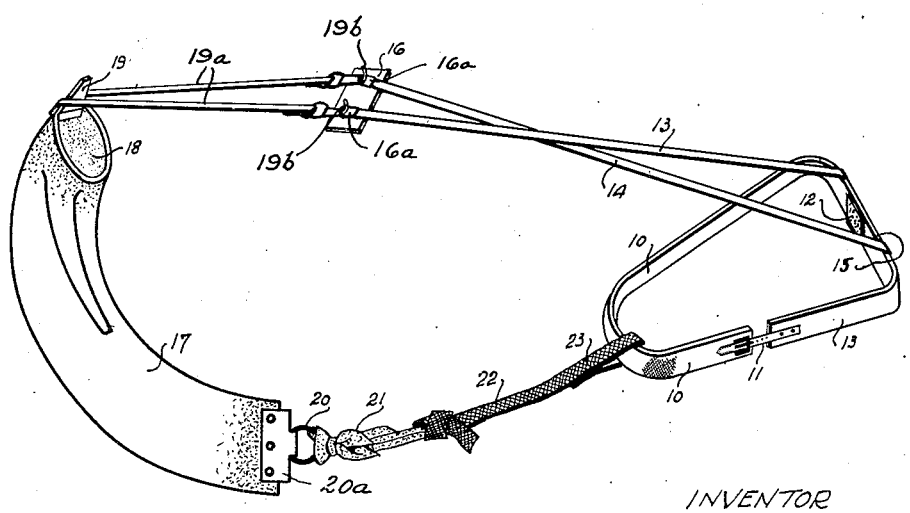

The invention will be more fully described by reference to the attached drawings, which illustrate a satisfactory form of apparatus for use on pregnant mares, and in which Figure 1 is a view of a mare, partly broken away, with the apparatus according to the invention attached to her, Figure 2 is a general perspective view of the apparatus, Figure 3 is a rear view of the upper part of the container with the straps connected to the shield, Figure 4 is a side view of the upper part of the container, Figure 5 is a perspective view of the body strap with the pad connected thereto by strap means, and Figure 6 is a detail view of the connections to the lower end of the container.

Like numerals of reference indicate corresponding parts in the various figures.

Referring to the drawings, the apparatus consists of a body strap 10 which is adapted to encircle the withers of a horse, the strap being provided with an adjustable fastener 11 and suitably padded as at 12. Leather straps 13 and 14 are secured at laterally spaced points to the upper portion 15 of the body strap and extend rearwardly therefrom to the croup of the horse and these straps are adjustably secured to the pad 16 at laterally spaced points. Pad 16 is adapted to rest on the back of the mare just above the base of the tail and has two laterally spaced openings 16a, the utility of which will be discussed presently. The container for the urine is preferably in the form of a long narrow bag 17 of flexible material such as rubber, preferably arcuate in shape. Bag 17 is closed at its lower end and has an opening 18 at its upper end. Connected to the container 17 at one side of the opening and projecting across the opening is a shield 19 which is preferably of substantially stiffer material than the container and may advantageously be in the form of a somewhat truncated triangle as shown in Fig. 3. The opening 18 at the upper end of the container preferably extends, as appears most clearly from Figure 4, substantially diagonally to the length of the container, as such a form increases the comfort of the apparatus and avoids any possibility of the opening becoming partially closed under certain conditions of wear.

Attached to the outer face of shield 19 are two straps 19a provided with hooks 19b at their free ends and adapted to extend one on either side of the tail of the mare and to be connected by means of hooks 19b to openings 16a in pad 16 as shown in Figs. 2 and 4. The attachment of straps 13 and 14 to the body strap 10 and to pad 16 at laterally spaced points makes the container less likely to get out of position upon slight movements of strap 10, and the attachment of straps 19a to pad 16 at laterally spaced points together with the positioning of pad 16 close to the base of the tail of the animal ensures that straps 19a will not be so close together as to cause chafing on either side of the tail.

In order to keep the container as far as possible out of the way of the animal's legs, and to permit the use of a larger container than might otherwise be possible, bag 17 is preferably made arcuate in the direction of its length as shown in Figs. 1 and 2, and its lower and closed ends is connected to body strap 10 underneath the body of the animal by strap means which are substantially shorter than the total length of the strap connections from the shield to the body strap. In this way the container, when in position, passes forward between the rear legs of the animal, and is held up under its body.

The connection of the lower end of the container to the body strap may be made in any suitable way, and as shown includes a clamp 20a secured to the lower end of the bag and having a ring 20 secured to the clamp. A strap 22 has a loop around the bottom of body strap 10, and its rear end may be connected to the ring by a further strap 21. The latter strap may conveniently be of rubber or other rupturable material while strap 22 is preferably of a stronger flexible material such as leather, so that if the animal should catch the apparatus with its leg, breakage will always take place at strap 21.

It will be noted that the means for detachably supporting the container in the right position when applied to a horse may be accomplished in many different ways coming within the scope of the appended claims without in any way departing from the essential features of this invention. For example, instead of using a body strap a collar (not shown) about the horse's neck could be utilized with a similar result.

Once the apparatus is applied to the horse, the groom or stable boy simply has to detach the upper end of the bag from the pad 16 by unhooking hooks 19b and, holding the hooks, let down the open end of the container and empty the same into an appropriate receptacle, and then return the emptied bag to its operative position on the horse and secure the same in place again by reengaging hooks 19b in the spaced openings in pad 16.

What I claim is:

1. An apparatus for collecting urine from pregnant mares, comprising a container in the form of a bag of flexible material closed at its lower end and having an opening at its upper end, a relatively stiff shield connected to said container at one side of said opening and projecting above the opposite side of said opening, a body strap adapted to pass about a forward part of the body of the mare, means connecting said shield to said body strap to hold the upper end of said shield securely against the mare below the anus and above the urethral orifice and to hold the opposite side of said opening of the container below said urethral orifice, whereby urine enters the bag through the opening while fecal matter is excluded by said shield, and means including a rupturable section connecting the lower end of said container to said body strap.

2. An apparatus for collecting urine from pregnant mares, comprising a container in the form of a bag of flexible material closed at its lower end and having an opening at its upper end, a relatively stiff shield connected to said container at one side of said opening and projecting above the opposite side of said opening, a body strap adapted to pass about a forward part of the body of the mare, and means connecting said shield to said body strap to hold the upper end of said shield securely against the mare below the anus and above the urethral orifice and to hold the opposite side of said opening of the container below said urethral orifice, whereby urine enters the bag through the opening while fecal matter is excluded by said shield, said means including a pad adapted to rest on the back of the animal slightly above the base of the tail, two straps adapted to extend one on each side of the tail of the animal and detachably connected to said pad at spaced points located one on each side of the center line of the animal, and at least one longitudinally extending strap connecting said pad to said body strap.

GILBERT EWAN ARNOLD.

REFERENCES CITED

The following references are of record in the file of this patent:

UNITED STATES PATENTS

| Number | Name | Date |
| --- | --- | --- |
| 749,382 | Henderson | Jan. 12, 1904 |
| 798,464 | Sprague | Aug. 29, 1905 |
| 881,753 | Whitehouse | Mar. 10, 1908 |
| 900,783 | Roberts | Oct. 13, 1908 |
| 940,077 | Sherman | Nov. 16, 1909 |
| 994,884 | Stewart | June 13, 1911 |
| 1,162,359 | Horiuch | Nov. 30, 1915 |
| 2,277,043 | Cohn | Mar. 24, 1942 |

FOREIGN PATENTS

| Number | Country | Date |
| --- | --- | --- |
| 79,449 | Germany | Feb. 6, 1895 |
| 101,087 | Germany | Jan. 23, 1899 |
| 111,151 | Germany | Mar. 11, 1899 |
| 735 | Austria | Dec. 27, 1899 |
| 756,672 | France | Dec. 13, 1933 |

OTHER REFERENCES

Bulletin de la Societe De Chimie Biopogique, Tome XV, pp. 562–606, pas M. Andre Girard— 1933.